US011483485B2

(12) United States Patent
Fu et al.

(10) Patent No.: US 11,483,485 B2
(45) Date of Patent: Oct. 25, 2022

(54) DEVICE FOR COLLECTING PHOTOS OF FIELD SURFACE FEATURE AND INFORMATION MEASUREMENT AND CALCULATION METHOD

(71) Applicants: Institute of Geographic Sciences and Natural Resources Research, Chinese Academy of Sciences, Beijing (CN); Nanjing University, Jiangsu (CN)

(72) Inventors: Dongjie Fu, Beijing (CN); Xuege Wang, Beijing (CN); Fenzhen Su, Beijing (CN)

(73) Assignees: Institute of Geographic Sciences and Natural Resources Research, Chinese Academy of Sciences, Beijing (CN); Nanjing University, Jiangsu (CN)

( * ) Notice: Subject to any disclaimer, the term of this patent is extended or adjusted under 35 U.S.C. 154(b) by 289 days.

(21) Appl. No.: 16/850,503

(22) Filed: Apr. 16, 2020

(65) Prior Publication Data

US 2020/0336670 A1     Oct. 22, 2020

(30) Foreign Application Priority Data

Apr. 18, 2019 (CN) .......................... 201910311856.3

(51) Int. Cl.
*H04N 5/232* (2006.01)
*G06T 7/70* (2017.01)
(Continued)

(52) U.S. Cl.
CPC ........... *H04N 5/23299* (2018.08); *G06T 7/70* (2017.01); *G06V 20/41* (2022.01); *G06V 20/56* (2022.01);
(Continued)

(58) Field of Classification Search
CPC .. H04N 5/23299; H04N 5/2257; H04N 5/247; H04N 13/239; H04N 13/221;
(Continued)

(56) References Cited

U.S. PATENT DOCUMENTS 8,744,680 B2 * 6/2014 Rieger ............... G01C 21/3602
701/119
2011/0164037 A1 * 7/2011 Yoshida .................. G06T 15/30
345/419
(Continued)

*Primary Examiner* — Lin Ye
*Assistant Examiner* — Tuan H Le
(74) *Attorney, Agent, or Firm* — Knobbe Martens Olson & Bear LLP

(57) ABSTRACT

The present invention provides a device for collecting photos of a field surface feature and an information measurement and calculation method. The photo collection device includes a motion camera, a pan-tilt, and a movable carrier. The motion camera is fixed to the movable carrier by using the pan-tilt, and when the movable carrier is in a driving process, the motion camera regularly takes a clear and measurable surface feature photo, to obtain a set of continuous surface feature photos with geographical coordinates. The device for collecting photos in the present invention is portable, is easily assembled, and can stably and continuously take clear and measurable photos, to resolve a problem that a photo taken in a high-speed motion state is fuzzy. The device can be applied to remote sensing of large-scale field research.

8 Claims, 3 Drawing Sheets

(51) Int. Cl.
  *H04N 13/239* (2018.01)
  *H04N 5/225* (2006.01)
  *H04N 5/247* (2006.01)
  *G06V 20/40* (2022.01)
  *G06V 20/56* (2022.01)

(52) U.S. Cl.
  CPC ........... *H04N 5/2257* (2013.01); *H04N 5/247* (2013.01); *H04N 13/239* (2018.05)

(58) Field of Classification Search
  CPC ......... H04N 13/271; G06T 7/70; G06T 7/254; G06T 7/80; G06T 2207/10016; G06T 2207/20081; G06T 2207/20084; G06T 2207/30252; G06V 20/41; G06V 20/56; G06V 10/255; G01C 11/08; B60R 11/04; B60R 2300/30; B60R 2300/804; B60R 1/00; B60R 2300/402; G06K 9/6271
  See application file for complete search history.

(56) References Cited

U.S. PATENT DOCUMENTS

| | | | | |
|---|---|---|---|---|
| 2015/0339533 | A1* | 11/2015 | Liu | G06V 20/58 |
| | | | | 382/104 |
| 2018/0330175 | A1* | 11/2018 | Corcoran | H04N 7/181 |
| 2018/0330509 | A1* | 11/2018 | Watanabe | B60W 30/09 |
| 2020/0097738 | A1* | 3/2020 | Aragon | G06T 7/50 |
| 2020/0183411 | A1* | 6/2020 | Oba | B60W 50/14 |

\* cited by examiner

ID FOR COLLECTING PHOTOS OF
FIELD SURFACE FEATURE AND
INFORMATION MEASUREMENT AND
CALCULATION METHOD

CROSS-REFERENCE TO RELATED APPLICATIONS

This application claims priority to Chinese Patent Application No. CN 201910311856.3, filed Apr. 18, 2019. The foregoing application is hereby incorporated by reference in its entirety.

TECHNICAL FIELD

The present invention relates to the field of remote sensing classification technologies, and specifically, to a device for collecting photos of a field surface feature and an information measurement and calculation method.

BACKGROUND

Land use/land cover change is one of fundamental problems of the global change and sustainable development research. The remote sensing monitoring technology has become a unique effective technical method to obtain information of land use/cover at continental/regional scale. One of the most desirable aspects of land use/land cover community is the accuracy assessment, and one of main source of reference data is field investigation. The photo taken in the field represents desirable information for interpretation and land use/land cover validation.

Currently, hardware or smart phone application software (apps) that meets the requirement of land use/land cover validation at field investigation emerged in endlessly, which can be used to track, record and take photos. The typical apps include OSMTracker, 2bulu, ODK Collect, Open Foils Collect Mobile, Global Croplands, GVG agricultural situation sampling system etc. When taking photo, the corresponding time and coordinate information can be recorded via these smartphone apps. However, most taken photos are in a static state or a slowly driving state, which lead to fewer land surface feature photos. When specific speed is exceeded, the taken photo may be fuzzy due to a limited capacity of camera chip performance of smartphone. For example, when the vehicle speed exceeds 40 km/h, the photo taken by the GVG agricultural situation sampling system will be fuzzy. In addition, companies such as Google and Baidu provide street views, and photos of surface features on two sides of a road in the survey region can be obtained without field work, however, using Google Street View or the Baidu Total View, on one hand, large-scale street view information is updated slowly, and is time delayed, on the other hand, some remote regions do not have street views, affecting reliability of remote sensing interpretation in real time. Meanwhile, neither a tool such as the OSMTracker used to verify field land use/land cover nor the Google Street View can measure height and width information land surface feature within photo, and the height and width information is one of most desirable information for land use/land cover classification and validation.

SUMMARY

In view of the foregoing technical problem, an objective of the present invention is to provide a device for collecting photos of a field surface feature and an information measurement and calculation method. A movable carrier such as a vehicle is used to carry a motion camera, and photos of field surface features on two sides of a road can be taken regularly and continuously when the vehicle is in a driving state, to obtain, with reference to a field of view and height information of the motion camera, high-quality clear field surface feature photos that are distributed along the road and that have attributes such as coordinates including longitudes and latitudes, observation heights, observation azimuth angles, and observation zenith angles. After being classified, the photo set may be used for remote sensing of interpretation and verification of land cover information.

To achieve the foregoing objective, technical solutions used in the present invention are as follows:

In one aspect of the present invention, a device for collecting photos of a field surface feature is provided, and includes: a motion camera, a pan-tilt, and a movable carrier, where the motion camera is fixed to the movable carrier by using the pan-tilt, and when the movable carrier is in a driving process, the motion camera regularly takes clear and measurable surface feature photos, to obtain a set of continuous surface feature photos with geographical coordinates.

In some embodiments of the present invention, the movable carrier is a vehicle, there are at least two motion cameras, the motion cameras are fixed to inner side surfaces of window glass of the vehicle, and photographing angles of view of every two motion cameras are different.

In another aspect of the present invention, an information measurement and calculation method for a field surface feature is further provided, and includes the following steps:

assembling the photo collection device described above, and measuring a height h of the motion camera from the ground;

taking, by the motion camera, a photo of a surface feature based on preset parameters in a moving process of the movable carrier;

calculating a height H of the surface feature;

calculating a width W of the surface feature; and classifying obtained photos, and summarizing information.

In some embodiments of the present invention, when the height H of the surface feature is calculated, a calculation formula is as follows:

$$H = \frac{b*A}{a} + h - s*\tan\frac{\theta}{2},$$

where a is a height of a photo, A is a frame height of actual photographing, b is a height of a photographed part of a surface feature on the photo, s is a distance between the motion camera and the surface feature, and θ is a vertical field of view of the motion camera.

In some embodiments of the present invention, when the width W of the surface feature is calculated, a calculation formula is as follows:

$$W = 2*\frac{w}{c}*s*\tan\frac{\sigma}{2},$$

where c is a width of a photo, w is a width of a surface feature on the photo, s is a distance between the motion camera and the surface feature, and a is a horizontal field of view of the motion camera.

In some embodiments of the present invention, a distance between a roadside surface feature and a lane of the movable carrier is measured by using a high-definition remote sensing image at a corresponding time on Google Earth, to obtain the distance s between the motion camera and the surface feature.

It can be learned from the foregoing technical solutions that the device for collecting photos of a field surface feature and the information measurement and calculation method in the present invention has at least the following beneficial effects: In the present invention, the movable carrier such as the vehicle, the pan-tilt, and the motion camera are re-combined, so that the collection device is portable, is easily assembled, not only can continuously, regularly, and dynamically collect photos of surface features on two sides of a road, but also can meet a requirement of taking a clear and measurable photo of a surface feature in a high-speed driving state, to obtain a set of continuous field surface feature photos that are for a survey region and that have geographical coordinates. After the obtained photo set is classified, the photo set is better applied to surface feature recognition, and interpretation and verification of land use/land cover.

MAIN COMPONENTS

1—Motion camera; and
2—Vehicle.

DETAILED DESCRIPTION OF CERTAIN EMBODIMENTS

For remote sensing of verification and research of field land use/land cover, particularly, field research of a large region, to obtain more clear and measurable photos of field surface features, a method capable of quickly and stably collecting clear and measurable photos of field surface features needs to be used in a driving process, to better meet a requirement of classifying and verifying land use/land cover.

To make the objectives, the technical solutions, and the advantages of the present invention clearer, the following further describes in detail the present invention with reference to specific embodiments and the accompanying drawings.

Figure 1:
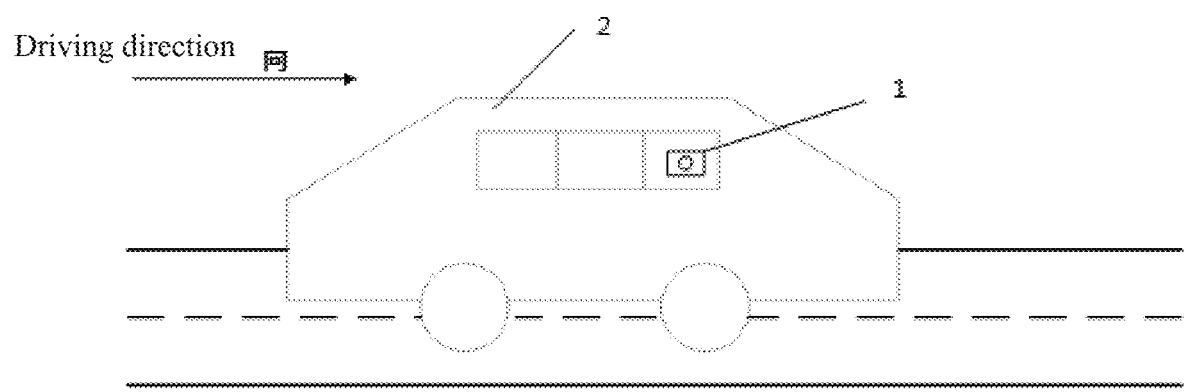
FIG. 1 is a schematic diagram of a photo collection device according to an embodiment of the present invention.

An embodiment of the present invention provides a device for collecting photos of a field surface feature. As shown in FIG. 1, the device for collecting photos of a field surface feature in the present invention includes a motion camera 1, a pan-tilt, and a movable carrier. The motion camera 1 is fixed to the movable carrier by using the pan-tilt, and when the movable carrier carrying the motion camera 1 is in a driving process, the motion camera 1 regularly takes clear and measurable surface feature photos, to obtain a set of continuous surface feature photos with geographical coordinates.

In the present invention, the motion camera 1 is selected and used, and compared with a space camera or an aerial camera, the motion camera 1 is more portable and is cheap. On the other hand, a photo taken by the motion camera 1 in a high-speed moving state is clear, the motion camera 1 can perform regular automatic photographing, and has a GPS sensor and the like, for example, GoPro HER07Black. Being clear herein means that a surface feature on the photo can be recognized, to meet a requirement of recognizing a surface feature, and interpreting and verifying land use/land cover. There may be multiple motion cameras 1. The motion cameras are fixed to different parts of the movable carrier, so that the multiple motion cameras 1 face different angles of view. In this way, surface features in different angles of view can be photographed at the same time, to improve, photo collection efficiency.

The movable carrier may be a vehicle 2, and the motion camera 1 is fixed to the vehicle 2 by using the pan-tilt, to ensure that the motion camera 1 does not shake because the vehicle jolts and the like, and quality of a taken photo is not affected. A preferable solution is as follows: The motion cameras 1 are fixed to window glass on two inner sides of the vehicle 2. Because the window glass is clean, the motion camera 1 can take clear surface feature photos through the window glass. In this way, when the vehicle 2 is driven on a road, different motion cameras 1 can photograph surface features on two sides of the road at the same time, to improve photo collection efficiency. Certainly, the multiple motion cameras 1 may be alternatively fixed to front window glass or rear window glass, and photographing angles of view of the motion cameras 1 are selected based on a survey region.

The following describes in detail components of the device for collecting photos of a field surface feature.

The following describes an information measurement and calculation method for a field surface feature.

First, a motion camera 1 is selected and used. As shown in FIG. 1, the motion camera 1 is fixed to glass on one of two inner sides of the vehicle 2, and a height h of the motion camera 1 from the ground is measured.

Second, the motion camera 1 takes a photo of a surface feature based on preset parameters in a driving process of the vehicle 2. The preset parameters are in the following table based on parameters such as a road status of a driving route, vehicle speed setting, and a photographing time interval:

| | |
|---|---|
| Size (MB) of one photo | 6 |
| Photographing time interval (second) | 5 |
| Quantity of photos taken every minute | 12 |
| Minutes of one hour | 60 |
| Photographing hours (8:00 to 18:00) | 10 |
| Size (GB) of photos taken every day | 42.1875 |
| Quantity of photos taken every day | 7200 |
| Speed (kilometer per hour) | 80 |
| Speed (meter per second) | 22.2222 |
| Photographing spacing (meter) | 111.1111 |

Figure 2:
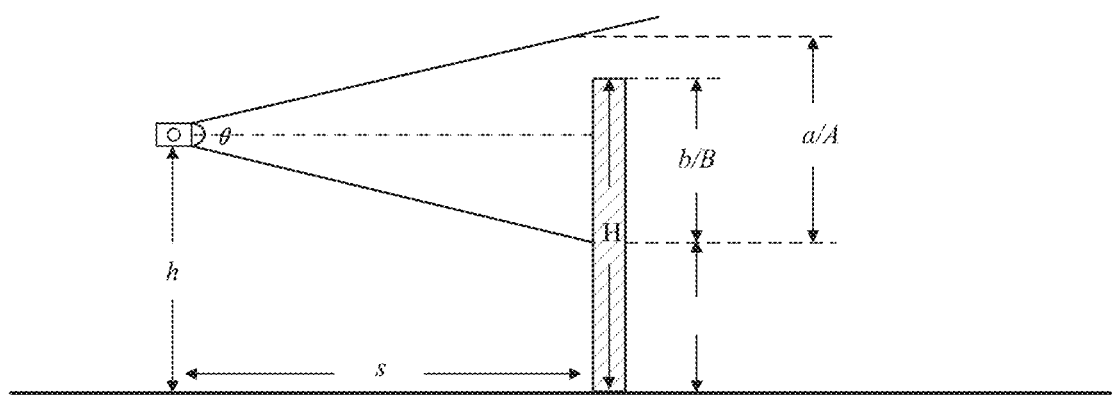
FIG. 2 is a schematic diagram of measuring a height of a surface feature according to an embodiment of the present invention.

Then, a height H of the surface feature is calculated. As shown in FIG. 2, a indicates a height of a photo, A is a frame height of actual photographing, b is a height of a photographed part of the surface feature on the photo, h is a height of the motion camera 1, H is an actual height of the surface feature, and S is a distance between the motion camera 1 and the surface feature. h, s, and θ are known variables. h may be used to measure a height of the motion camera 1 from the ground after the motion camera 1 is fixed, and a distance between the roadside surface feature and a lane of the vehicle 2 is measured by using a high-definition remote sensing image at a corresponding time on Google Earth, to obtain s. For a vertical field of view θ, corresponding information may be obtained based on the used motion camera 1. For example, when a photo size of GoPro HER07 is 4:3, and a zoom ratio is 0%, the vertical field of view θ is 94.4 degrees. a and b can be obtained through measurement and calculation on the photo. Then, $$H = \frac{b*A}{a} + h - s*\tan\frac{\theta}{2}$$

Figure 3:
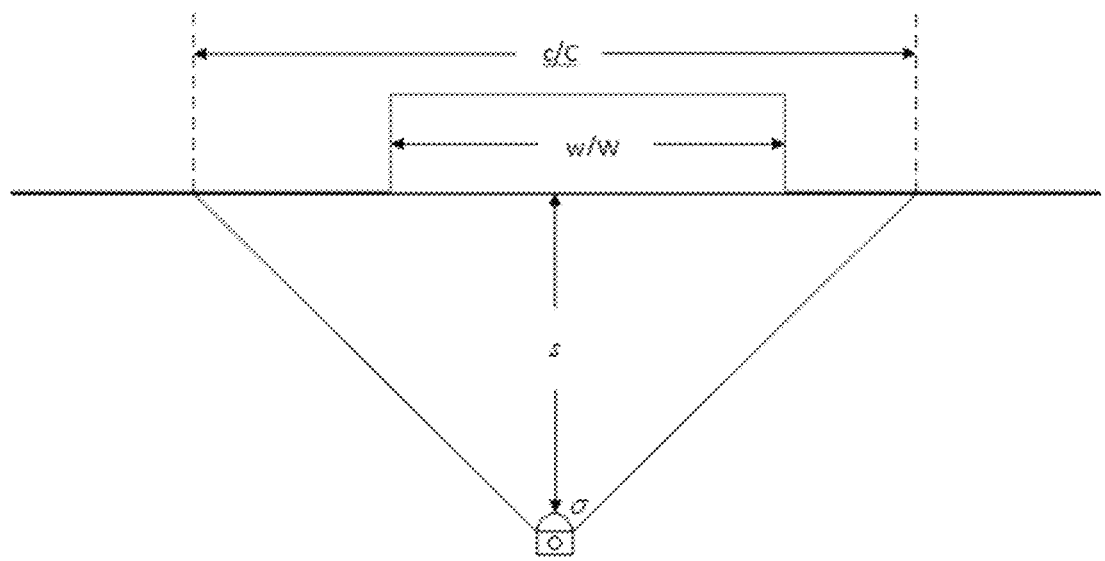
FIG. 3 is a schematic diagram of measuring a width of a surface feature according to an embodiment of the present invention.

Then, a width W of the surface feature is calculated. As shown in FIG. 3, c indicates a width of the photo, C is a frame height of actual photographing, w is a width of the surface feature on the photo, W is an actual width of the surface feature, and s is a distance between the motion camera 1 and the surface feature. s and σ are known variables. A distance between the roadside surface feature and a lane of the vehicle 2 is measured by using a high-definition remote sensing image at a corresponding time on Google Earth, to obtain s. For a horizontal field of view σ, corresponding information may be obtained based on the used motion camera 1. For example, when a photo size of GoPro HER07 is 4:3, and a zoom ratio is 0%, the horizontal field of view σ is 122.6 degrees. c and w may be obtained through measurement and calculation on the photo. Then, $$W = 2*\frac{w}{c}*s*\tan\frac{\sigma}{2}$$

Finally, obtained photos are classified, and information is summarized.

So far, this embodiment is described in detail with reference to the accompanying drawings. Based on the foregoing descriptions, a person skilled in the art should clearly know the device for collecting photos of a field surface feature and the information measurement and calculation method in the present invention. The photo collection device in the present invention is portable, is easily assembled, and can stably and continuously take clear and measurable photos, to resolve a problem that a photo taken in a high-speed motion state is fuzzy. The device can be applied to remote sensing of field research of a large region.

It should be noted that in the accompanying drawings or the specification, an implementation that is not drawn or described is a form known by a person of ordinary skill in the art, and is not described in detail. In addition, definitions of the elements and the method are not limited to specific structures, shapes, or forms mentioned in the embodiments. A person of ordinary skill in the art may make simple change or replacement thereto.

It should be noted that same elements in the accompanying drawings are represented by using same or similar reference numerals. In the following descriptions, some specific embodiments are merely used for the purpose of description, but should not be understood as any limitation to the present invention, and are merely examples of the embodiments of the present invention. When a normal structure or construction may cause confusion to the understanding of the present invention, the normal structure or construction is omitted. It should be noted that a shape and a size of each component in the figure does not represent a real size and proportion, and are merely examples of content of the embodiments of the present invention.

The objective, the technical solutions, and the beneficial effects of the present invention are further described in detail in the foregoing specific embodiments. It should be understood that the foregoing merely shows specific embodiments of the present invention, and is not used to limit the present invention. Any modification, equivalent replacement, improvement, or the like made within the spirit and principle of the present invention shall be included in the protection scope of the present invention.

What is claimed is:

1. A method of information measurement and calculation for a field surface feature, the method comprising:
   assembling a photo collection device, and measuring a height h of the motion camera from the ground; wherein the photo collection device comprise a motion camera, a pan-tilt, and a movable carrier, wherein the motion camera is fixed to the movable carrier by using the pan-tilt, and when the movable carrier is in a driving process, the motion camera regularly takes a clear and measurable surface feature photo, to obtain a set of continuous surface feature photos with geographical coordinates;
   taking, by the motion camera, a photo of a surface feature based on preset parameters in a moving process of the movable carrier;
   calculating a height H of the surface feature;
   calculating a width W of the surface feature; and
   classifying obtained photos, and summarizing information;
   wherein when the height H of the surface feature is calculated, a calculation formula is as follows:

$$H = \frac{b*A}{a} + h - s*\tan\frac{\theta}{2},$$

wherein
   a is a height of a photo, A is a frame height of actual photographing, b is a height of a photographed part of a surface feature on the photo, s is a distance between the motion camera and the surface feature, and θ is a vertical field of view of the motion camera.

2. The method of claim 1, wherein when the width W of the surface feature is calculated, a calculation formula is as follows:

$$W = 2*\frac{w}{c}*s*\tan\frac{\sigma}{2},$$

wherein
   c is a height of a photo, w is a width of a surface feature on the photo, s is a distance between the motion camera and the surface feature, and σ is a horizontal field of view of the motion camera.

3. The method of claim 2, wherein a distance between a roadside surface feature and a lane of the movable carrier is measured by using a high-definition remote sensing image at a corresponding time on Google Earth, to obtain the distance s between the motion camera and the surface feature.

4. The method of claim 1, wherein a distance between a roadside surface feature and a lane of the movable carrier is measured by using a high-definition remote sensing image at a corresponding time on Google Earth, to obtain the distance s between the motion camera and the surface feature.

5. A method of information measurement and calculation for a land surface feature, the method comprising:
- assembling a photo collection device, and measuring a height h of the motion camera from the ground; wherein the photo collection device comprise: a motion camera, a pan-tilt, and a movable carrier, wherein the motion camera is fixed to the movable carrier by using the pan-tilt, and when the movable carrier is in a driving process, the motion camera regularly takes a clear and measurable surface feature photo, to obtain a set of continuous surface feature photos with geographical coordinates; wherein the movable carrier is a vehicle, there are at least two motion cameras, the motion cameras are fixed to inner side surfaces of window glass of the vehicle, and photographing angles of view of every two motion cameras are different;
- taking, by the motion camera, a photo of a surface feature based on preset parameters in a moving process of the movable carrier;
- calculating a height H of the surface feature;
- calculating a width W of the surface feature; and
- classifying obtained photos, and summarizing information;
- wherein when the height H of the surface feature is calculated, a calculation formula is as follows:

$$H = \frac{b * A}{a} + h - s * \tan\frac{\theta}{2},$$

wherein
- a is a height of a photo, A is a frame height of actual photographing, b is a height of a photographed part of a surface feature on the photo, s is a distance between the motion camera and the surface feature, and θ is a vertical field of view of the motion camera.

6. The method of claim 5, wherein when the width W of the surface feature is calculated, a calculation formula is as follows:

$$W = 2 * \frac{w}{c} * s * \tan\frac{\sigma}{2},$$

wherein
- c is a height of a photo, w is a width of a surface feature on the photo, s is a distance between the motion camera and the surface feature, and σ is a horizontal field of view of the motion camera.

7. The method of claim 6, wherein a distance between a roadside surface feature and a lane of the movable carrier is measured by using a high-definition remote sensing image at a corresponding time on Google Earth, to obtain the distance s between the motion camera and the surface feature.

8. The method of claim 5, wherein a distance between a roadside surface feature and a lane of the movable carrier is measured by using a high-definition remote sensing image at a corresponding time on Google Earth, to obtain the distance s between the motion camera and the surface feature.

* * * * *